(12) United States Patent
Stotts

(10) Patent No.: US 11,131,909 B2
(45) Date of Patent: Sep. 28, 2021

(54) APPARATUS FOR SUPPORTING A CAMERA DEVICE

(71) Applicant: Steven Stotts, Philadelphia, PA (US)

(72) Inventor: Steven Stotts, Philadelphia, PA (US)

(73) Assignee: Steven Stotts, Philadelphia, PA (US)

( * ) Notice: Subject to any disclaimer, the term of this patent is extended or adjusted under 35 U.S.C. 154(b) by 0 days.

(21) Appl. No.: 16/910,527

(22) Filed: Jun. 24, 2020

(65) Prior Publication Data
US 2021/0055633 A1 Feb. 25, 2021

Related U.S. Application Data

(60) Provisional application No. 62/870,715, filed on Jul. 4, 2019.

(51) Int. Cl.
*G03B 17/56* (2021.01)
*G03B 15/02* (2021.01)

(52) U.S. Cl.
CPC .......... *G03B 17/561* (2013.01); *G03B 15/02* (2013.01); *G03B 17/566* (2013.01)

(58) Field of Classification Search
None
See application file for complete search history.

(56) References Cited

U.S. PATENT DOCUMENTS

| | | | | |
|---|---|---|---|---|
| 7,050,715 B1* | 5/2006 | Carrington | ........... | G03B 15/035 396/182 |
| 8,139,122 B2* | 3/2012 | Rolston | ................ | G03B 15/03 348/222.1 |
| 2009/0003822 A1* | 1/2009 | Tyner | .................... | F16M 11/28 396/428 |
| 2010/0073545 A1* | 3/2010 | Rodriquez | .......... | G02B 25/005 348/333.12 |
| 2013/0176412 A1* | 7/2013 | Chen | .................... | F16M 11/041 348/77 |
| 2014/0055978 A1* | 2/2014 | Gantz | ................. | H04B 1/3888 362/8 |
| 2016/0277660 A1* | 9/2016 | Kaiser | ....................... | F16B 2/12 |
| 2017/0118385 A1* | 4/2017 | Vargas | ................ | G03B 17/561 |
| 2019/0003699 A1* | 1/2019 | Mondora | ............. | F21V 33/004 |
| 2019/0075922 A1* | 3/2019 | Rivera | .................... | A46B 17/08 |
| 2020/0116347 A1* | 4/2020 | Frydenger | .............. | H05B 45/22 |
| 2020/0333934 A1* | 10/2020 | Pestl | ...................... | G10L 15/26 |
| 2021/0055633 A1* | 2/2021 | Stotts | ................... | G03B 17/561 |

* cited by examiner

*Primary Examiner* — William B Perkey

(57) ABSTRACT

The present invention relates to an apparatus for that allows a user to support a camera device and provides lighting for an area to be photographed. Beneficially, the invention allows for an engaging portable photobooth experience to provided by event hosts. The apparatus comprises a base assembly with a frame configured to receive and hold a camera device in a first orientation with the camera of the camera device pointing along a first axis with respect to the base assembly. The apparatus also comprises a lighting assembly comprising a power module connected to a plurality of lighting elements which are positioned around the frame and which are configured to direct light in a direction substantially parallel to the first axis. Various implementations of the apparatus of the present invention are also provided.

10 Claims, 6 Drawing Sheets

APPARATUS FOR SUPPORTING A CAMERA DEVICE

CROSS REFERENCE TO RELATED APPLICATION

This application claims the benefit of U.S. Provisional Application Ser. No. 62/870,715 which was filed on Jul. 4, 2019, the entirety of which incorporated herein by reference.

FIELD OF INVENTION

The present invention relates generally to an apparatus comprising a base assembly for supporting a camera device. More specifically, the present invention relates to an apparatus for simultaneously holding a camera device in place to take a photograph or video while providing lighting of the area to be photographed.

BACKGROUND

Data collection kiosks and photo booths are often used by brand ambassadors, event hosts, and company representatives for entertainment and data collection purposes. One of the best ways to entice guests at public events to collect data is by taking photos which can be shared or sent to them via social media or a mailing list. However, traditional stationary photo booths are usually placed in areas away from the guests during events and it is often difficult to encourage guests to use them.

A need therefore exists for a solution that allows an event host to bring the photobooth kiosk experience to a user and thereby more easily engage guests, both for entertainment and for data collection purposes. It is within this context that the present invention is provided.

SUMMARY

The present invention provides an apparatus having a frame for holding a camera device and one or more lighting elements for lighting an area to be photographed by the camera device. Advantageously, the apparatus of the present invention acts like a portable photo kiosk that can be carried around an event by a host to encourage guests to interact with it.

Thus, according to a first aspect of the present invention, there is provided an apparatus for supporting a camera device and for lighting an area to be photographed or videoed, the apparatus comprising a base assembly, the base assembly comprising: a frame configured to receive and hold a camera device in a first orientation with the camera of the camera device pointing along a first axis with respect to the base assembly, a lighting assembly comprising power module connected to a plurality of lighting elements which are positioned around the frame and which are configured to direct light in a direction substantially parallel to the first axis.

In one embodiment, the power module comprises a disposable battery power module. In another embodiment, the power module is a rechargeable power module and further comprises a charging port.

In one embodiment, the one or more lighting elements are a plurality of LED lighting elements. The LED lighting elements may be in the form a ring around the camera device when it is in position.

In one embodiment, the apparatus further comprises a detachable handle comprising a handgrip and an elongated support extending between the handgrip and the base assembly. The elongated supported may be extendable. Furthermore, the detachable handle may include an adjustable joint element for orienting the base assembly with respect to the handle.

In one embodiment, the base assembly further comprises a mirror that enables users to view themselves conveniently prior to taking a photograph.

In one embodiment, the frame for holding the camera device is adjustable to hold camera devices of different dimensions and proportions.

BRIEF DESCRIPTION OF THE DRAWINGS

Various embodiments of the invention are disclosed in the following detailed description and accompanying drawings.

FIG. 4 illustrates an exploded view of an example configuration of the apparatus of the present invention which comprises a detachable handle that may be detachably connected to the base assembly.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 1:
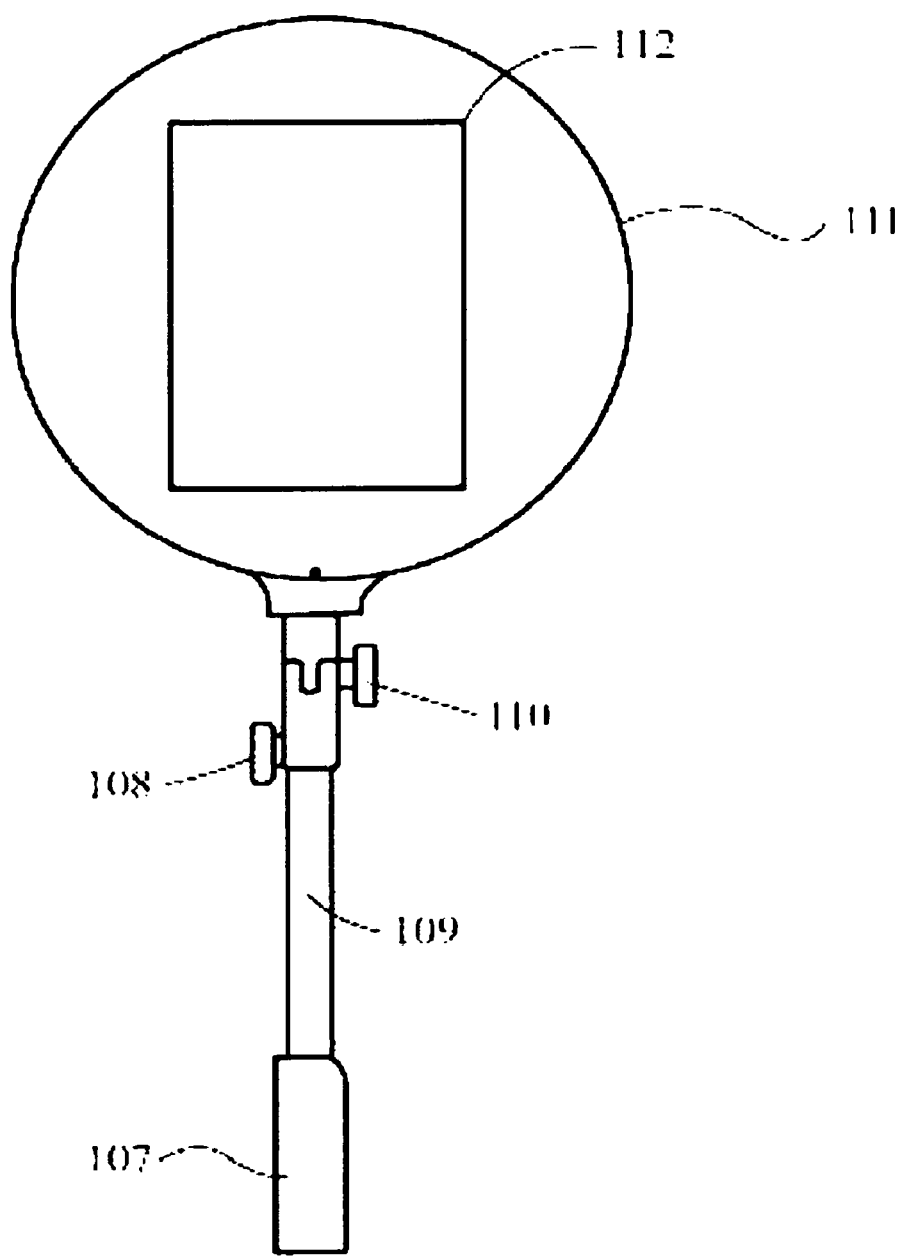
FIG. 1 illustrates a front view of an example configuration of the apparatus of the present invention, the front of the device being the side which is configured to support a camera device.

Referring to FIG. 1, a front view of an example configuration of the apparatus of the present invention is shown, the front of the device being the side which is configured to support a camera device.

The apparatus comprises a base assembly 111 in the form of a frame with a first side of the frame having a fitting 112 being configured to support a camera device such as a smartphone or a tablet, and having a number of lighting elements located on the first side and configured to provide lighting in the direction that a camera of a camera device held in the frame is pointing. The apparatus thereby acts as a portable photobooth.

In the present example, the apparatus further comprises a detachable cushioned handle 107 and handle shaft 109 which can be attached to a bottom portion 156 of the base assembly to allow the apparatus and camera device to be held further than an arm's length from a user to provide a better angle for a photograph. Advantageously, the bottom portion of the base assembly may include multiple controls for adjusting the angle of the base assembly with respect to the handle shaft and thereby allowing a user to choose the best angle for taking photographs of themselves and others. In the present example, a single control 110 in the form of a rotatable knob on the side of the bottom portion is utilised for controlling the angle by causing a hinged connection on the bottom portion of the base assembly to close or open depending on which way the knob is turned.

Furthermore, the handle and handleshaft are detachable from the base assembly, further increasing the portability and convenience of the apparatus. The detachment is controlled by a second control 108 which also takes the form of a rotatable knob on the bottom portion of the base assembly and which, when turned, either loosens or tightens a female clamped opening at the end of the bottom portion of the base assembly allowing a user to clamp the bottom portion of the base assembly tightly around the detachable handle shaft.

Figure 2:
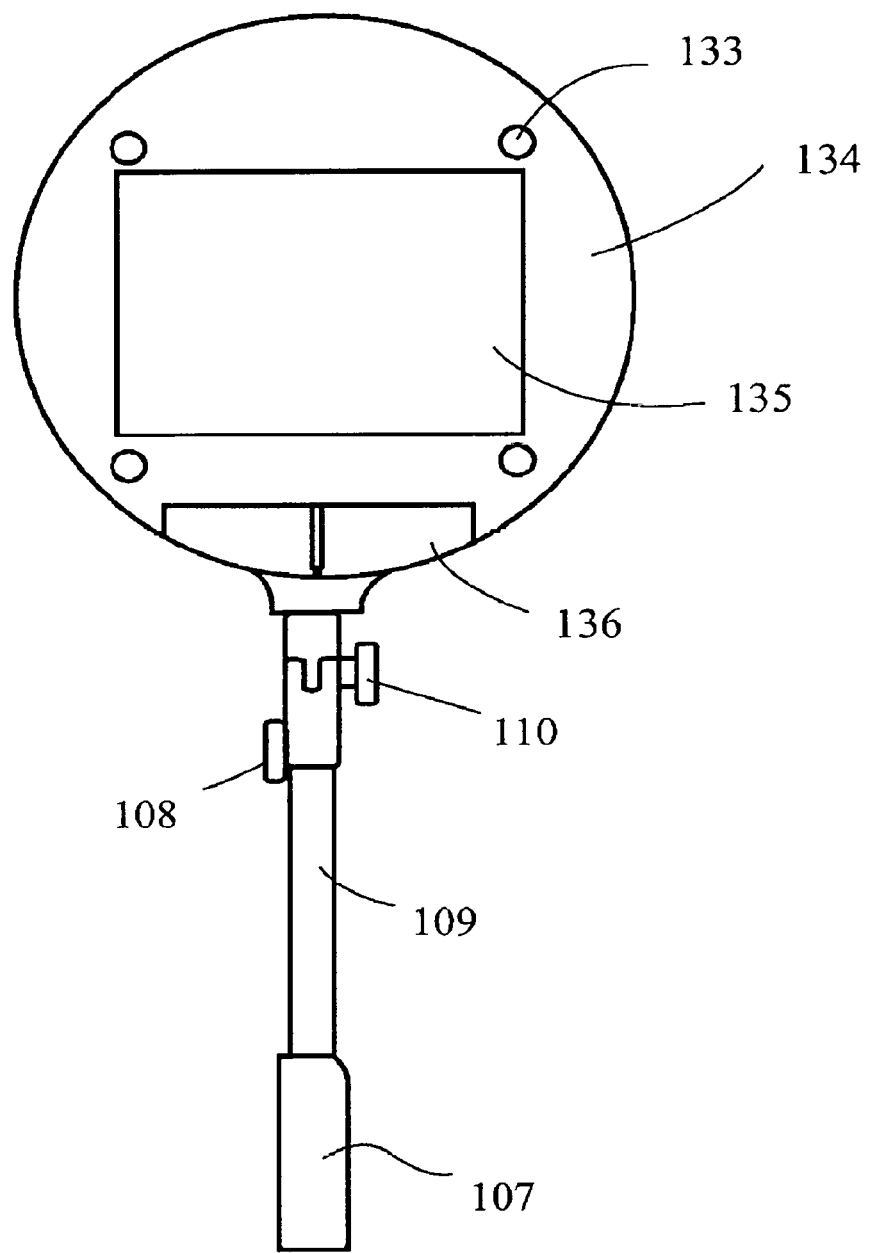
FIG. 2 illustrates a back view of an example configuration of the apparatus of the present invention.

Referring to FIG. 2, a back view of an example configuration of the apparatus of the present invention is shown that is similar to or the same as the first example.

In the present example, the cushioned handle 107, the handle shaft 109, the angle control 110 and the detachment control 108 as described above in relation to the first example.

Further illustrated in the back view provided are a set of bolts 133, which are set into the back side 134 of the base assembly and form the foundation for the fitting 112 which supports a camera device. In the present example the bolts are placed in a rectangular pattern to support each corner of a held device.

The bolts 133 also provide a foundation for securing a plurality of lighting elements to the front side of the base assembly as will be explained in more detail below.

One optional feature which is illustrated in the present example is the inclusion of a mirror or other reflective surface 135 on the back side of the base assembly which conveniently provides a way for users of the device to check their reflections before taking a photograph.

Finally, the back of the base assembly includes a power unit 136 which is connected to any lighting elements which are fit to the front of the base assembly and which, in some embodiments, can also provide charge to a camera device which is held by the apparatus. The power module may simply be an opening configured to receive and draw power from disposable batteries, or it may be a rechargeable battery itself which is encased in the base assembly, such as for example a lithium polymer type battery. In the case of a rechargeable battery module, the power module further comprises a charging port for recharging, such as for example a lightning charging port or usb-o port.

Figure 3:
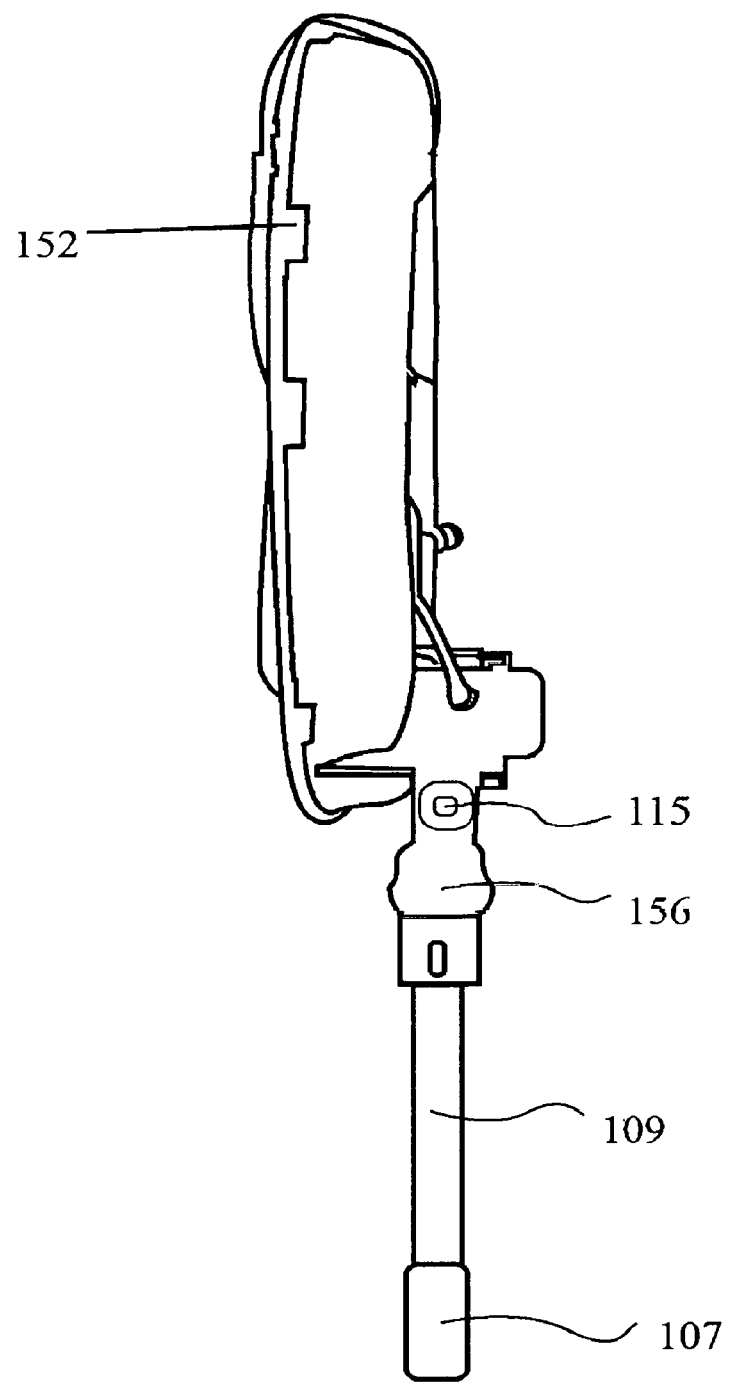
FIG. 3 illustrates a side view of an example configuration of the apparatus of the present invention.

Referring to FIG. 3, a side view of an example configuration of the apparatus of the present invention is shown which is similar to or the same as the configurations described above.

In the present example, the cushioned handle 107, the handle shaft 109, and the base assembly stem or bottom portion 156 configured to receive the detachable handle are the same as their like elements described above.

Further illustrated is a protective cover 152 which is fit onto the front side of the apparatus and which both protects any lighting elements fit onto the front and also allows for light emitted by those elements to be filtered to a desired level.

Additionally, a lighting element control 115 which is in the form of a button set into the base assembly stem 156 in the present example, is shown. The button 115 has the function of activating or deactivating the lighting elements, it is therefore located between the lighting elements and the power module and controls the power supply therebetween. The lighting element trigger 115 may alternatively take the form of an adjustable knob which can brighten or dim the lighting elements, providing a spectrum of lighting options in place of a binary on/off button.

Referring to FIG. 4, an exploded view of an example configuration of the apparatus of the present invention is shown which comprises a detachable handle that may be detachably connected to the base assembly.

Figure 4A:
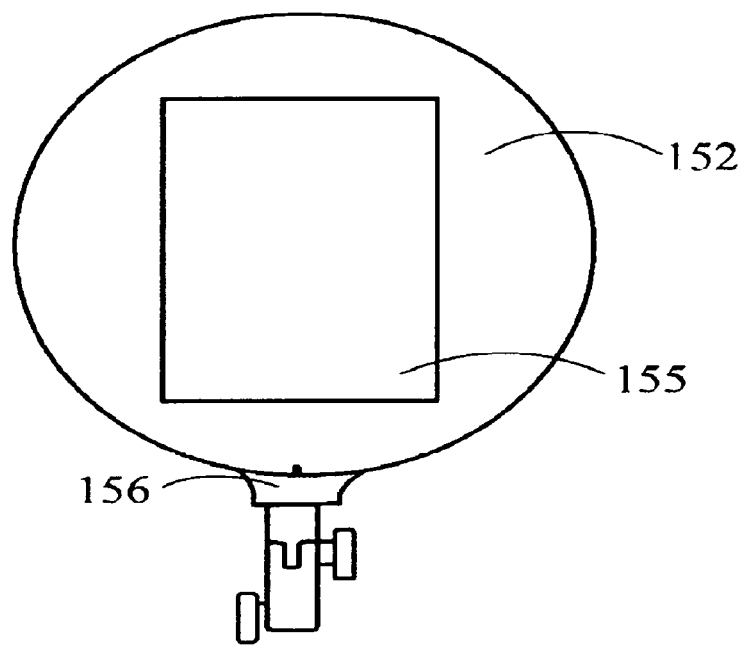
FIG. 4A illustrates a front view of the base assembly.

FIG. 4A illustrates a front view of the base assembly. The elements labelled in FIG. 4A are as described above for reference numerals having like numbers.

Figure 4B:
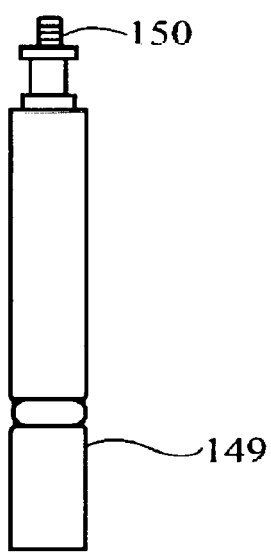
FIG. 4B illustrates the detachable handle.

FIG. 4B illustrates the detachable handle. In the present example, the cushioned handle 149 is shown to be the same thickness as the handle shaft. Furthermore, a male connecting element 150 is shown at the top of the detachable handle, that is the end opposite to the cushioned handle, which is configured to fit into the female component of the base assembly stem and thereby attach the two together. The male element 150 is shown as having a threaded end for achieving this effect but other means are possible.

In some embodiments not illustrated, the detachable handle shaft may be replaced by a longer detachable handle shaft for photographing people in hard to reach positions. Alternatively, the apparatus may comprise a detachable stand for mounting the base assembly to when not carried by an operator.

Figure 4C:
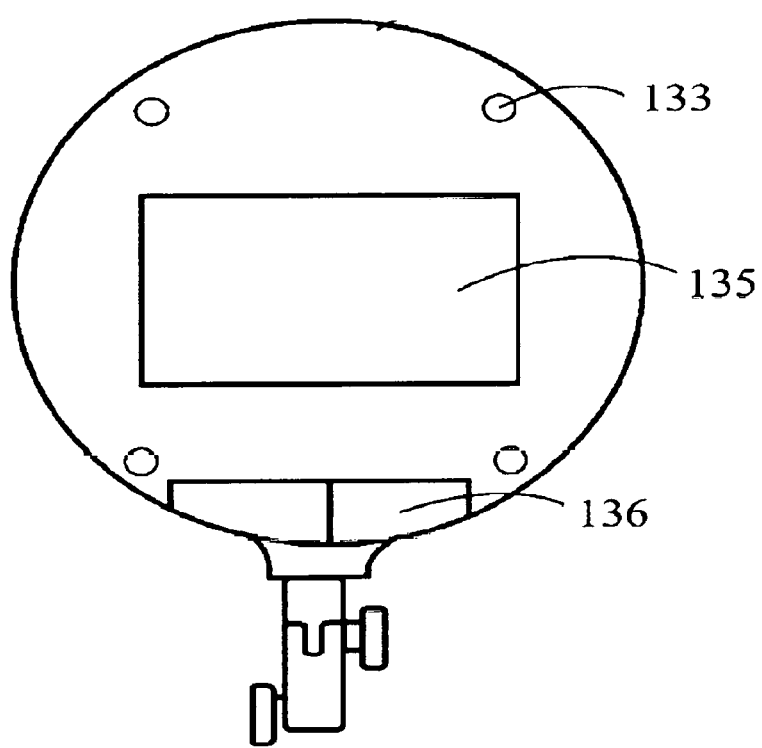
FIG. 4C illustrates a back view of the base assembly.

FIG. 4C illustrates a back view of the base assembly. The elements labelled in FIG. 4A are as described above for reference numerals having like numbers.

Shown in the exploded view, FIGS. 4A, 4B, and 4C provide an indication of how the different components of the device fit together.

Figure 5:
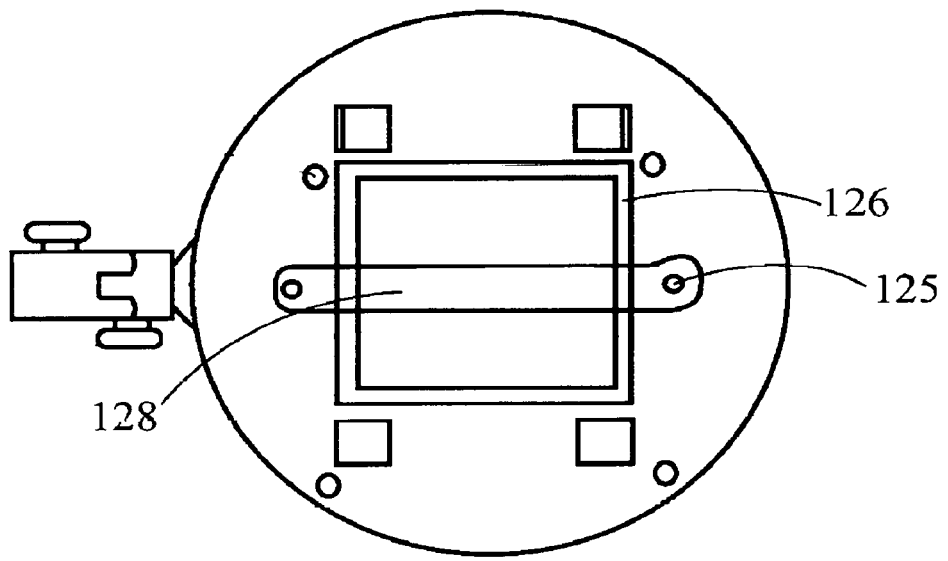
FIG. 5 illustrates a front view of another example configuration of the apparatus of the present invention.

Referring to FIG. 5, a front view of an example configuration of the apparatus of the present invention is shown which is similar to or the same as the configurations described above.

In this figure, an example method of securing a camera device 126 in place on the base assembly is shown. This is achieved by having a bracket fitting 128 in the form of a strap that can be brought across the front face of the device and which is secured in place itself by more bolts 125 laid into the front surface of the base assembly. Although this specific method of securing the device is illustrated, many methods of securing camera devices to surfaces are known and are contemplated as being applicable to the present invention even if not explicitly disclosed herein.

Figure 6:
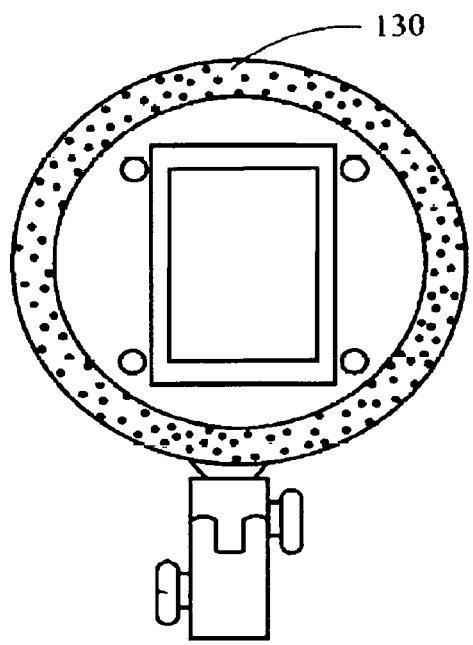
FIG. 6 illustrates a front view of another example configuration of the apparatus of the present invention.

Referring to FIG. 6, a front view of an example configuration of the apparatus of the present invention is shown that is similar to or the same as the configurations described above.

In the figure, the lighting elements 130 located on the front surface of the base assembly are illustrated. These lighting elements 130 are powered by the power module and controlled by the lighting element control 115 as described above.

Preferably, the lighting elements are LEDs, and there are a large number of lighting elements which surround the fitting on the front surface of the base assembly in a ring.

This, advantageously, provides a good strong light from all angles to illuminate the faces of people taking a photograph with the camera device.

In some alternative embodiments, the lighting elements may be LEDs capable of providing different colours of lights for a stylised photograph. The LEDs may also be configured to light up in patterns of different colours.

With the technical features described above, the apparatus of the present invention enables an operator to provide the experience of a photo booth kiosk at any position in an event venue, encouraging guests to interact with the photo kiosk and provide personal details so that pictures and videos taken with the camera device can be transmitted to them via social media, mailing lists, or even printed wirelessly. The device is functional both outdoors and indoors and can house any kind of tablet, android or iPad.

LIST OF REFERENCE NUMERALS IN DRAWINGS

107: handle
108: control to tighten/loosen handle attachment
109: handle shaft
110: control to adjust base assembly angle with respect to handle
111: base assembly frame
112: fitting configured to receive camera device
115: button for taking a picture?
126: camera device
128: bracket for securing the camera device to the base assembly
130: light elements activated during use
133: bolts for securing lighting elements to base assembly frame
134: back side of base assembly frame
135: mirror attached to base assembly frame
136: power unit
149: Cushion handle for the use of the operator to carry the device
150: male fitting on handle for connecting to base assembly
152: protective cover and filter for lighting elements
155: camera device secured in place on base assembly
156: base assembly stem configured to receive detachable handle

CONCLUSION

The disclosed embodiments are illustrative, not restrictive. While specific configurations of the smart garment, audio media device, and the kit of the audio media device and pouch have been described in a specific manner referring to the illustrated embodiments, it is understood that the present invention can be applied to a wide variety of smart garment solutions which fit within the scope and spirit of the claims. There are many alternative ways of implementing the invention.

What is claimed is:

1. Apparatus for supporting a camera device and lighting an area to be photographed, the apparatus comprising a base assembly, the base assembly comprising;
   a frame configured to receive and hold a camera device with the camera of the camera device in a first orientation with the camera of the camera device pointing along a first axis with respect to the base assembly, with a strap for holding the camera device to the frame and fastening means for fastening the strap to frame for support,
   a lighting assembly comprising power module connected to a plurality of lighting elements which are positioned around the frame and which are configured to direct light in a direction substantially parallel to the first axis.

2. Apparatus according to claim 1, wherein the power module comprises a disposable battery power module.

3. Apparatus according to claim 1, wherein the power module is a rechargeable power module and further comprises a charging port.

4. Apparatus according to claim 1, wherein the one or more lighting elements are LED lighting elements.

5. Apparatus according to claim 4, wherein the LED lighting elements form a ring around the device.

6. Apparatus according to claim 1, wherein the apparatus further comprises a detachable handle comprising a handgrip and an elongated support extending between the handgrip and the base assembly.

7. Apparatus according to claim 6, wherein the elongated supported is extendable.

8. Apparatus according to claim 6, wherein the detachable handle includes an adjustable joint element for orienting the base assembly with respect to the handle.

9. Apparatus according to claim 1, wherein the base assembly further comprises a mirror.

10. Apparatus according to claim 1, wherein the frame for holding the camera device is adjustable to hold camera devices of different dimensions and proportions.

* * * * *